R. SKEMP.
PROCESS OF FINISHING GALVANIZED SHEETS AND PLATES.
APPLICATION FILED SEPT. 26, 1918.
1,297,265.
Patented Mar. 11, 1919.
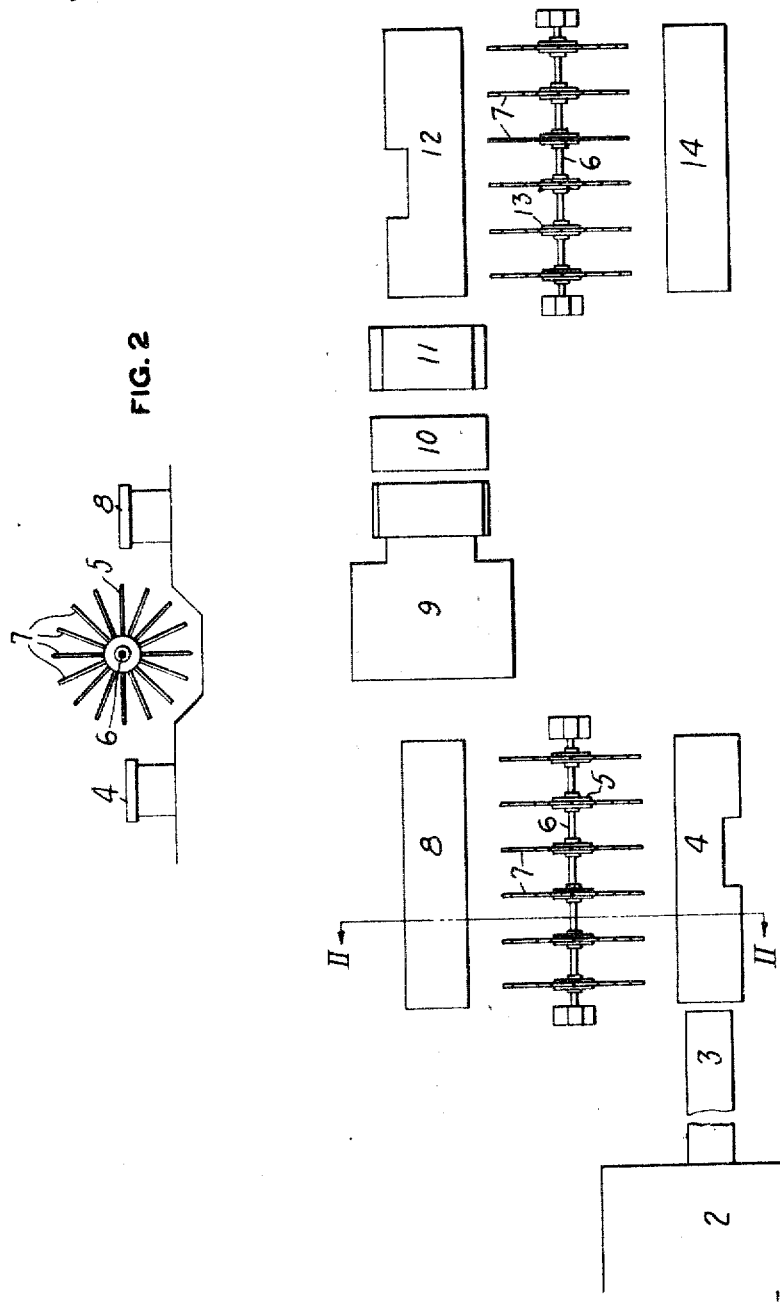
INVENTOR
ROBERT SKEMP
by D. Anthony Usina
his Attorney.

UNITED STATES PATENT OFFICE.

ROBERT SKEMP, OF SCOTTDALE, PENNSYLVANIA, ASSIGNOR TO AMERICAN SHEET AND TIN PLATE COMPANY, OF PITTSBURGH, PENNSYLVANIA, A CORPORATION OF NEW JERSEY.

PROCESS OF FINISHING GALVANIZED SHEETS AND PLATES.

1,297,265.  Specification of Letters Patent.  Patented Mar. 11, 1919.

Application filed September 26, 1918. Serial No. 255,802.

*To all whom it may concern:*

Be it known that I, ROBERT SKEMP, a citizen of the United States, residing at Scottdale, in the county of Westmoreland and State of Pennsylvania, have invented a new and useful Process of Finishing Galvanized Sheets and Plates, of which the following is a specification.

My invention relates to the finishing of galvanized materials, and more particularly to a process of flux finishing galvanized sheets and plates.

In making flux finished sheets or plates it is necessary to wash the materials after the coating operation in order to remove adherent flux and prevent discoloration of the surfaces of the materials, by the flux which, if not entirely removed, spoils the bright spangled appearance of the materials.

Heretofore in making flux finished sheets and plates it has been the practice, after passing the materials through the galvanizing pot, to cover the zinc coated surfaces of the materials as they emerge from the bath of coating metal, with a flux such as sal-ammoniac, which is soluble and which will readily wash off the materials, and to then pass the flux finished materials directly into and through a tank of water in order to wash off the flux, the washed sheets or plates then passing through a drier in which they are dried by applying heat thereto, and then through a roller leveler to the inspection table.

The above described process is very satisfactory, except in that a commercially flat sheet is not produced, the sheets becoming warped and distorted in passing them into the water to wash off the flux immediately after emerging from the highly heated bath of molten coating material.

The primary object of my invention is to provide a process of flux finishing galvanized sheets and plates employing a novel series of steps, whereby flux finished materials are produced which are commercially flat, without substantially increasing the cost of finishing the materials, and wherein the disadvantages of the old process are avoided and overcome.

Referring now to the drawings forming part of the specification, Figure 1 is a diagrammatic plan showing a preferred arrangement of apparatus adapted for use in carrying out my improved process.

Fig. 2 is a transverse section, on the line II—II of Fig. 1, showing an end elevation of the conveyer forming part of the apparatus.

In the accompanying drawing the numeral 2 designates the galvanizing pot in which the sheets and plates are coated with spelter. The surface of the molten coating metal in the pot 2 may be covered with a flux, through which the coated materials rise in passing from the galvanizing pot or, as is preferable, a finely divided, soluble fluxing material which dissolves readily in water, such as sal-ammoniac, is blown upon the coated surfaces as the coated materials emerge from the bath of molten spelter in the pot 2.

The coated materials, as they pass from the discharge end of the galvanizing pot 2, are delivered upon a conveyer 3 which carries the sheets or plates to the inspection table 4 where the surfaces of the materials are inspected for defects, any materials found to be imperfect or otherwise defective being laid aside or discarded. The perfect sheets or plates are passed from the table 4 to a cooling rack 5 which also acts as a conveyer, this rack as shown comprising a shaft 6 having a series of radial arms 7 radiating from the shaft. The cooling rack 5, which is caused to rotate slowly, carries the galvanized materials from the inspection table 4 to the feed table 8 to which they are removed from the cooling rack and in passing from the table 4 to the feed table 8, the materials are cooled below the temperature at which they will warp or distort when plunged in water.

The speed of the cooling rack 5 is such that although the materials are still heated somewhat and the flux is not cold enough to have become set, the sheets or plates will be cold enough to handle when they reach the feed table 8. When placed upon this feed table, the coated materials are mechanically caused to pass into and through the water bath in the washer 9 and the flux remaining on the coated surfaces is dissolved and washed off in passing through the washer.

The materials then pass from the washer 9 into and through a drier 10 which ordinarily is the usual form of muffle furnace, in which operation the washed materials are dried. The dry sheets or plates preferably, but not necessarily, are then passed through a roller leveler 11 of the usual known construction, (an appliance which usually comprises two sets of rollers having the vertical axes of the upper vertically adjustable set staggered relative to those of the positively rotated lower set), so that each sheet or plate in passing between the upper and lower sets of rollers is bent into a series of reverse curves, which effectually flattens any of the now cold materials, which are not exactly flat.

The sheets and plates then pass from the leveler 11 to the receiving table 12 at the discharge end of the leveler and are removed therefrom to a conveyer 13 similar in construction to the cooling rack 5, on which they are transferred to a bench 14 at which point they are finally inspected, afterward being delivered at a point of storage.

The advantages of my improved process arise from the sequence in which the various steps are carried out, to the end that the flux is effectually removed without warping or distortion of the galvanized materials, damage to the surfaces thereof is prevented and overcome and commercially flat flux finished galvanized sheets, of any and all sizes, are obtained without additional cost in manufacturing.

Modifications in the construction and arrangement of the apparatus used in carrying out my process may be made without departing from my invention. The type of conveyers employed may be changed. Means other than the cooling rack shown may be employed in cooling and conveying the plates, and apparatus other than the drier shown may be used in drying the washed plates within the scope of the appended claims.

I claim:—

1. The method of galvanizing flux finished sheets and plates which consists in applying the coating metal by passing the sheets and plates through a bath of molten spelter, applying the flux to the spelter coating as the sheets and plates emerge from the bath of molten spelter, washing the sheets and plates to remove the flux from the surfaces thereof while heated above the temperature at which the flux sets and delaying the washing operation after applying the flux until the sheets and plates are cooled below that temperature at which the sheets and plates will distort in the washing operation.

2. In the manufacture of flux finished galvanized sheets and plates, the steps consisting in passing the sheets and plates through a molten bath of spelter, applying the flux to the surfaces of the coated sheets and plates as the sheets and plates emerge from the galvanizing bath, cooling the galvanized sheets and plates to prevent distortion thereof in washing, and then washing the sheets and plates to remove the flux while still heated above the temperature at which the flux sets.

In testimony whereof I have hereunto set my hand.

ROBERT SKEMP.